(12) United States Patent
Lee et al.

(10) Patent No.: US 7,978,309 B2
(45) Date of Patent: Jul. 12, 2011

(54) CLAMPING APPARATUS CAPABLE OF FIXING A FILM AND IMAGE PROCESSING APPARATUS UTILIZING THE SAME

(75) Inventors: Ta-Yi Lee, Taipei County (TW); Jeicy Lee, Guangzhou (CN); Jy Tang, Xiangtan (CN)

(73) Assignee: Lite-On Technology Corporation, Taipei (TW)

( * ) Notice: Subject to any disclaimer, the term of this patent is extended or adjusted under 35 U.S.C. 154(b) by 1409 days.

(21) Appl. No.: 11/428,402

(22) Filed: Jul. 2, 2006

(65) Prior Publication Data

US 2007/0223065 A1  Sep. 27, 2007

(30) Foreign Application Priority Data

Mar. 23, 2006  (TW) ................................ 95204893 U

(51) Int. Cl.
 *G03B 27/62* (2006.01)
 *G03B 27/58* (2006.01)
(52) U.S. Cl. .......................................... 355/75; 355/74
(58) Field of Classification Search .................... 355/75, 355/96, 302, 487, 498, 506; 353/95; 352/221, 352/337, 229, 230
See application file for complete search history.

(56) References Cited

U.S. PATENT DOCUMENTS

| | | | | |
|---|---|---|---|---|
| 2,995,979 | A | * | 8/1961 | Gordon et al. ................. 355/75 |
| 3,776,626 | A | * | 12/1973 | Lewis .......................... 352/194 |
| 4,161,365 | A | * | 7/1979 | Anderson et al. ............... 355/75 |
| 4,774,553 | A | * | 9/1988 | Blanding et al. ................ 355/75 |
| 5,400,117 | A | * | 3/1995 | Fetterman et al. .............. 355/75 |
| 5,523,820 | A | * | 6/1996 | Mooney et al. ................. 355/76 |
| 5,617,185 | A | * | 4/1997 | North ............................. 355/75 |
| 5,673,104 | A | * | 9/1997 | Rottner ......................... 355/75 |
| 5,684,564 | A | * | 11/1997 | North ............................. 355/40 |
| 5,835,202 | A | * | 11/1998 | Rosati et al. ................... 355/75 |
| 5,880,819 | A | * | 3/1999 | Tanaka et al. .................. 355/75 |
| 5,926,289 | A | * | 7/1999 | Brandestini et al. .......... 358/487 |

* cited by examiner

*Primary Examiner* — Hung Henry Nguyen
(74) *Attorney, Agent, or Firm* — Li&Cai Intellectual Property (USA) Of

(57) ABSTRACT

A clamping apparatus capable of fixing a roll film is disclosed. The clamping apparatus includes: a carrier comprising a slot; a cover positioned in the slot; and a cannelure formed between the cover and the carrier, for guiding the film inserted from the first film door to a predetermined position. The cover includes: an upper ramp, positioned on one side of the cannelure opening, for guiding the film from the first film door to the cannelure opening, wherein a first edge of the upper ramp is near the cannelure opening, and a second edge of the upper ramp is away from the slot opening and inclines to the first edge of the upper ramp.

15 Claims, 5 Drawing Sheets

CLAMPING APPARATUS CAPABLE OF FIXING A FILM AND IMAGE PROCESSING APPARATUS UTILIZING THE SAME

BACKGROUND OF THE INVENTION

1. Field of the Invention

The present invention relates to a clamping apparatus, and more particularly, to a clamping apparatus capable of fixing a film and an image processing apparatus utilizing the same.

2. Description of the Prior Art

As digital techniques develop, image data are increasingly saved in a digital format. For example, conventional photographs, slides, and roll films can now be scanned by an image processing apparatus and then be saved and modified digitally in computers. In addition, a transmissive scanner installed into an optical image processing apparatus can be used to scan transparent media such as slides, filmstrip or roll films. Thereafter, the images on transparent media can also be transformed into digital data.

When a related art image processing apparatus scans the transparent documents, it utilizes a film fixture (i.e. a clamping apparatus) to orient the film. There are two methods that a user can take to fix the film (shown in FIG. 1 and FIG. 2). Please refer to FIG. 1. FIG. 1 is a schematic diagram of a conventional film fixture 100 when a cover 120 is open. The film fixture 100 comprises a carrier 110, upon which lies a film guiding cannelure 112 for carrying a roll film, a cover 120, and a pivot element 190.

The first method for fixing the film is detailed as follows: when the roll film is expanded flat on the carrier 110, the cover 120 can rotate relative to the carrier 110 through the pivot element 190 to fix the roll film until the cover 120 lies on the carrier 110. Unfortunately, expanding the film flat on the carrier is hard because the film is soft and will curl easily. Therefore, most users will utilize the second method to fix the film (FIG. 2). Please refer to FIG. 2. FIG. 2 is the schematic diagram of the film fixture 100 in FIG. 1 when the cover 120 is closed. As shown in FIG. 2, the cover 120 comprises a top-flat 240. A film door 250 forms between the top-flat 240 and the carrier 100. A cannelure 230 between the cover 120 and the carrier 110 is used to orient the film when it is inserted from the film door 250 and slid to the predetermined position. Although this method improves over the first method, there is an inherent disadvantage where the film is sometimes scratched while it is slid due to the friction between the film and the flat-top 230.

SUMMARY OF THE INVENTION

According to the present invention, a clamping apparatus capable of fixing a roll film is disclosed. The clamping apparatus comprises a carrier comprising a slot; a cover positioned in the slot; and a cannelure formed between the cover and the carrier, for guiding the film inserted from the first film door to a predetermined position, wherein the opening of the cannelure is connected to a first film door, and the cannelure is used for guiding the film inserted into the first film door to a predetermined position, the cover comprising: an upper ramp, positioned on one side of the cannelure opening, for guiding the film from the first film door to the cannelure opening, wherein a first edge of the upper ramp is near the cannelure opening, and a second edge of the upper ramp is away from the slot opening and inclines to the first edge of the upper ramp.

According to the present invention, an image processing apparatus is disclosed. The image processing apparatus comprises a clamping apparatus comprising: a carrier comprising a slot; a cover positioned in the slot; and a cannelure formed between the cover and the carrier, for guiding the film inserted from the first film door to a predetermined position, wherein the opening of the cannelure is connected to a first film door, and the cannelure is used for guiding the film inserted into the first film door to a predetermined position, the cover comprising: an upper ramp, positioned on one side of the cannelure opening, for guiding the film from the first film door to the cannelure opening, wherein a first edge of the upper ramp is near the cannelure opening, and a second edge of the upper ramp is away from the slot opening and inclines to the first edge of the upper ramp; and an image processing module, for performing a predetermined image process on the object.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
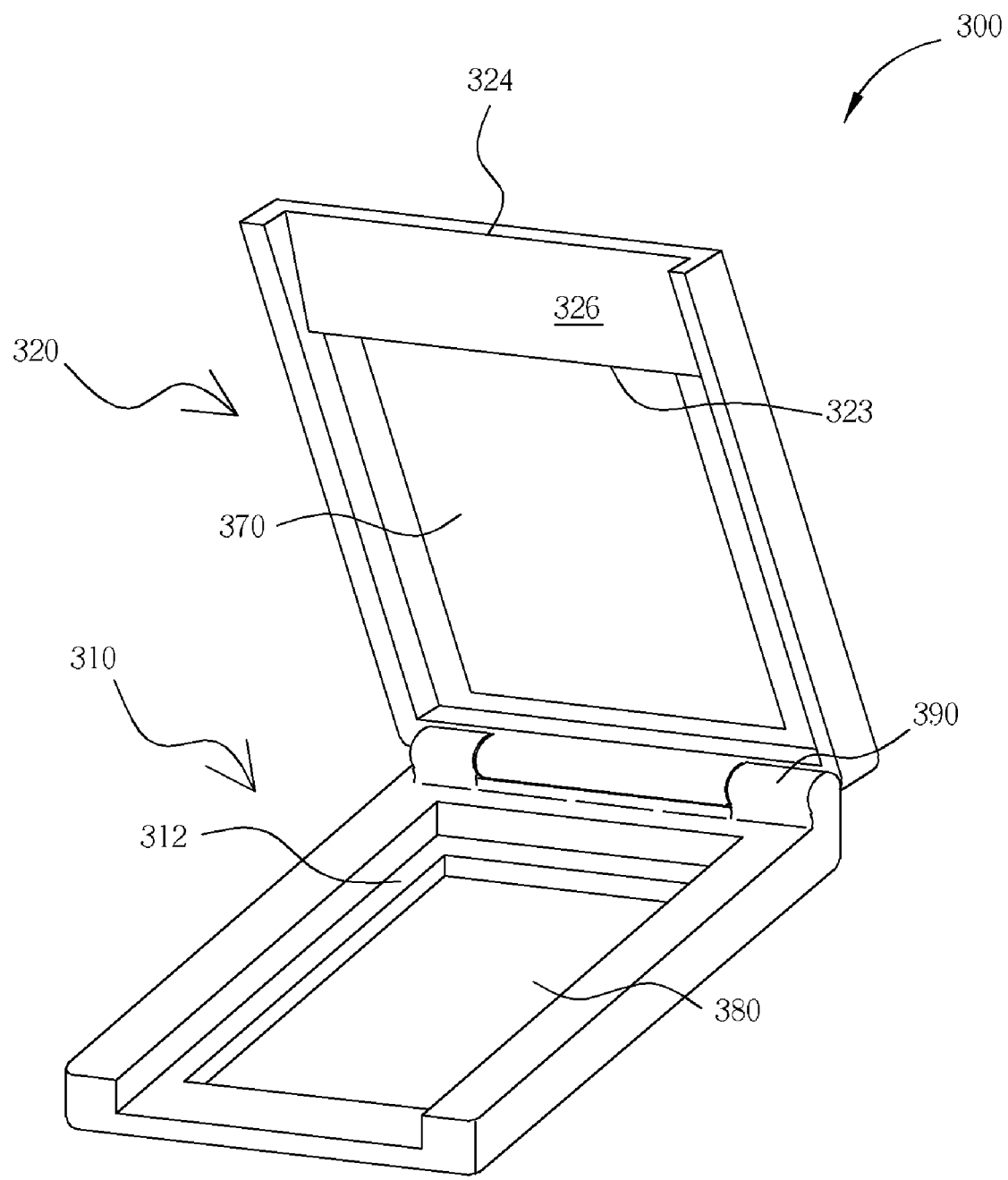
FIG. 3 is a schematic diagram of the clamping apparatus according to the present invention when the cover is open.
Figure 4:
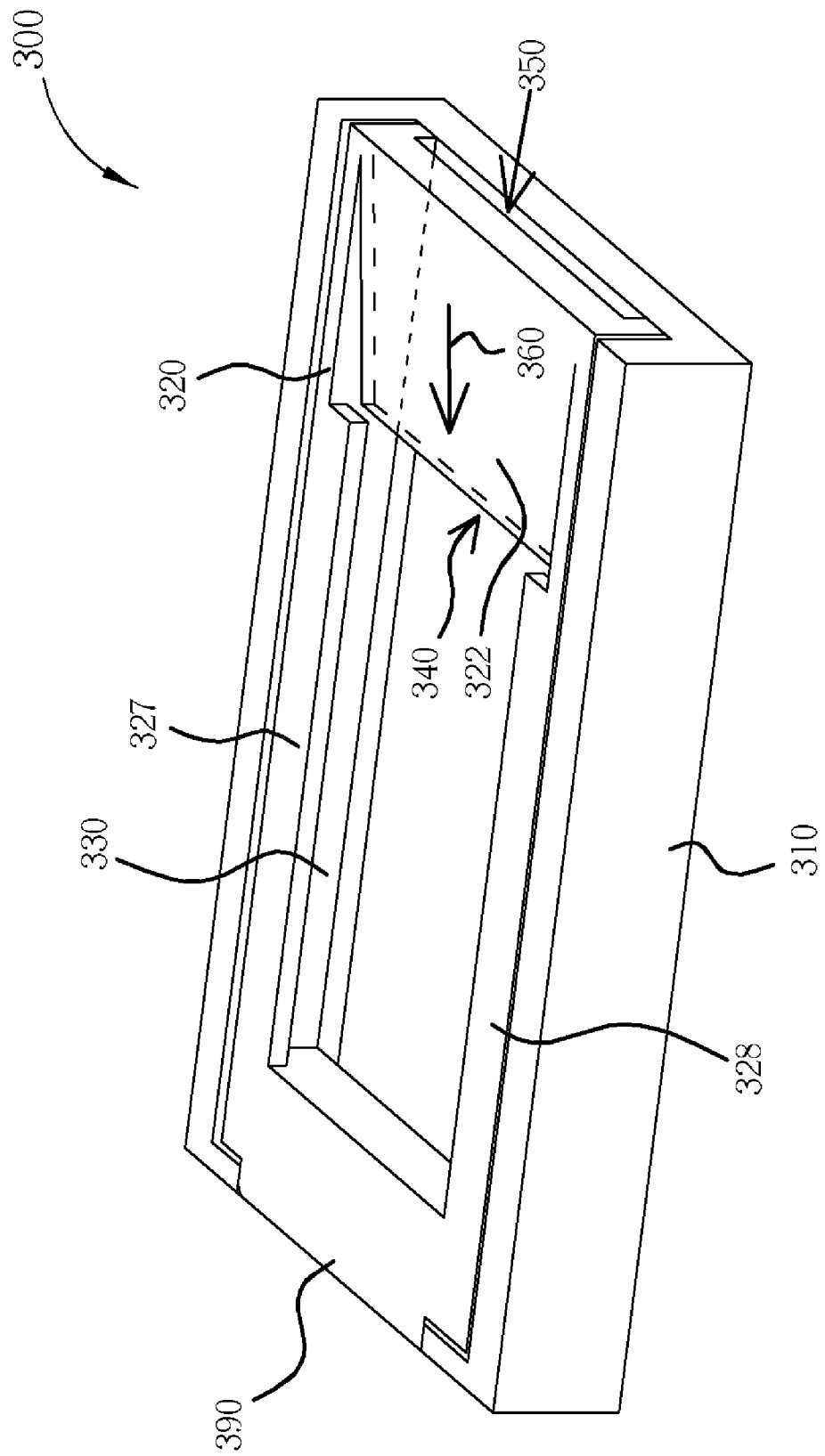
FIG. 4 is a schematic diagram of the clamping apparatus in FIG. 3 when the cover is closed.

Please refer to FIG. 3 and FIG. 4. FIG. 3 is a schematic diagram of a clamping apparatus 300 according to an embodiment of the present invention when a cover 320 is open, while FIG. 4 is a schematic diagram of the clamping apparatus 300 in FIG. 3 when the cover 320 is closed. The clamping apparatus 300 comprises a carrier 310, a cover 320, and a pivot element 390. The carrier 310 comprises a slot 312. The cover 320 can rotate relative to the carrier 310 and lie on the slot 312 through the pivot element 390 (shown in FIG. 4). A cannelure 330 is formed between the cover 320 and a carrier 310, wherein a cannelure opening 340 is connected to a first film door 360. The cannelure 330 is used to guide the film inserted from a cannelure opening 340 to the predetermined position. The cover 320 comprises: an upper ramp 322, a lower ramp 326, a first clamping rod 327, and a second clamping rod 328. The upper ramp 322 located on the one side of the cannelure opening 340 is used to guide the film inserted from the first film door 360 to the cannelure opening 340.

A first side 323 of the upper ramp 322 is near the cannelure opening 340, while a second side 324 of the upper ramp 322 is away from the cannelure opening 340 and inclines toward the first side 323. A first light-pervious area 370 is between the first clamping rod 327 and the second clamping rod 328. Please note that a second light-pervious area 380 corresponding to the first light-pervious area 370 is located in the slot 312. Light can penetrate the film through the first light-pervious area 370 and the second light-pervious area 380.

As shown in FIG. 4, the film is inserted from the film door 360, guided to the cannelure opening through the upper ramp 322, and then slid to the final position through the cannelure 330. Along the sliding path from the first film door 360 to the cannelure 330, no contact occurs between the film and the upper hardware, so the film will not be scratched.

In addition, another film door can be further installed into the present inventive clamping apparatus 300. As shown in FIG. 3 and FIG. 4, the lower ramp 326 is on one side of the cannelure opening. Please note that the lower ramp 326 and the upper ramp 322 are on each side of the cover 320 respectively, wherein the lower ramp 326 and the carrier 310 form the second film door 350 which is also connected to the cannelure opening 340. The lower ramp 326 is used to guide the film inserted from the second film door 350 to the cannelure opening 340, wherein the first side of the lower ramp 326 is near the cannelure opening 340, and the second side of the lower ramp 326 is away from the cannelure opening 340 and inclines to the first side when the cover 320 is closed. The method of inserting film from the second film door 350 is similar to the related art, so the detailed description is abbreviated for the sake of brevity.

Please note that in the embodiment mentioned above, a pivot element in the clamping apparatus 300 allows the cover 320 to rotate relative to the carrier 310, so the film is fixed in a similar way as the first fixing method described in the prior art. In the other embodiment of the present invention, as shown in FIG. 4, the carrier 310 and the cover 320 can be produced in one mode. When this is the case, the pivot element is not required anymore. The clamping apparatus can still prevent the film from being scratched, however, by having the film inserted from the superior direction.

Figure 5:
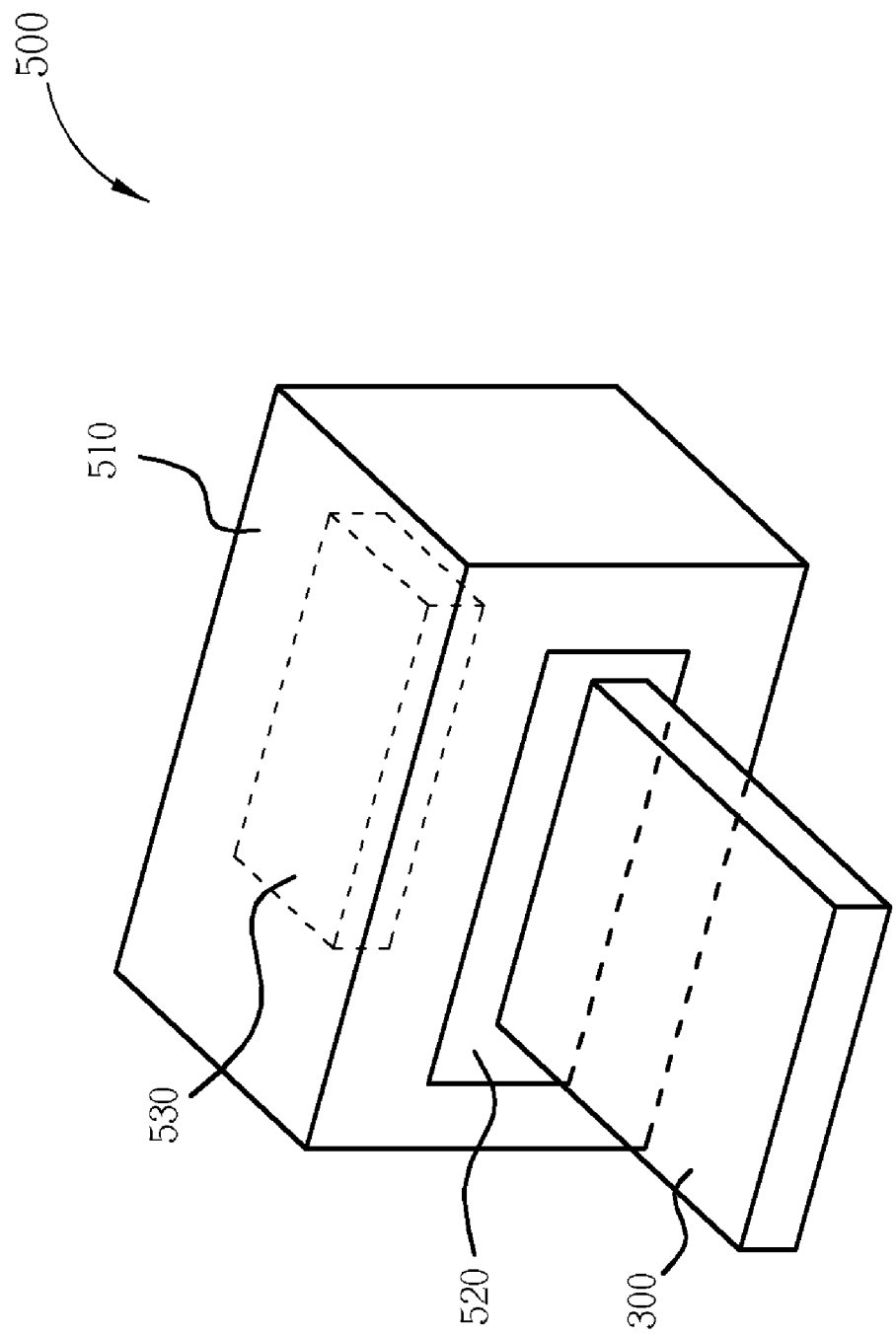
FIG. 5 is a schematic diagram of an image processing apparatus according to an embodiment of the present invention.

Please refer to FIG. 5. FIG. 5 is a schematic diagram of an image processing apparatus 500 according to an embodiment of the present invention. The image processing apparatus 500 utilizes the above clamping apparatus 300 to fix the object requiring processing. As shown in FIG. 5, the image processing apparatus 500 comprises: a housing 510, which comprises an opening 520, for insertion of the clamping apparatus 300; and an image processing module 530, for processing the object fixed in the clamping apparatus 300. In addition, the design of the opening 510 of the clamping apparatus 300 is not limited to the present embodiment. Any design that allows the installation of the clamping apparatus 300 into the image processing apparatus for performing image processing falls within the scope of the present invention. In the embodiment shown in FIG. 5, when the clamping apparatus 300 is inserted to the image processing apparatus 500 through the opening 510, the image processing module 530 is higher than the clamping apparatus 300 so that it can process the object fixed in the clamping apparatus 300. For example, the image process module 530 can be a scanning module for scanning the film fixed in the clamping apparatus 300. In another embodiment of the image processing apparatus, however, the image processing module 530 can have other functions and can be installed into other positions as required. For example, the image processing module 530 can be a copying module for copying the object fixed in the clamping apparatus 300.

Please note that the above clamping apparatus is only one of the embodiments of the present invention and is used here merely for the purpose of description. The present invention is not limited to those embodiments shown in the figures. According to the essence of the present invention and practical requirements, the invented clamping apparatus can fix any other size of object, e.g. 35 mm slide strip, 35 mm slide film, 120/220 (6×9 cm) film, and 4×5(inches) film. Furthermore, the present invention clamping apparatus can be adapted to any image processing devices that require orientation for objects needing processing, e.g. a scanning apparatus, a copy machine or a multitask machine.

Figure 1:
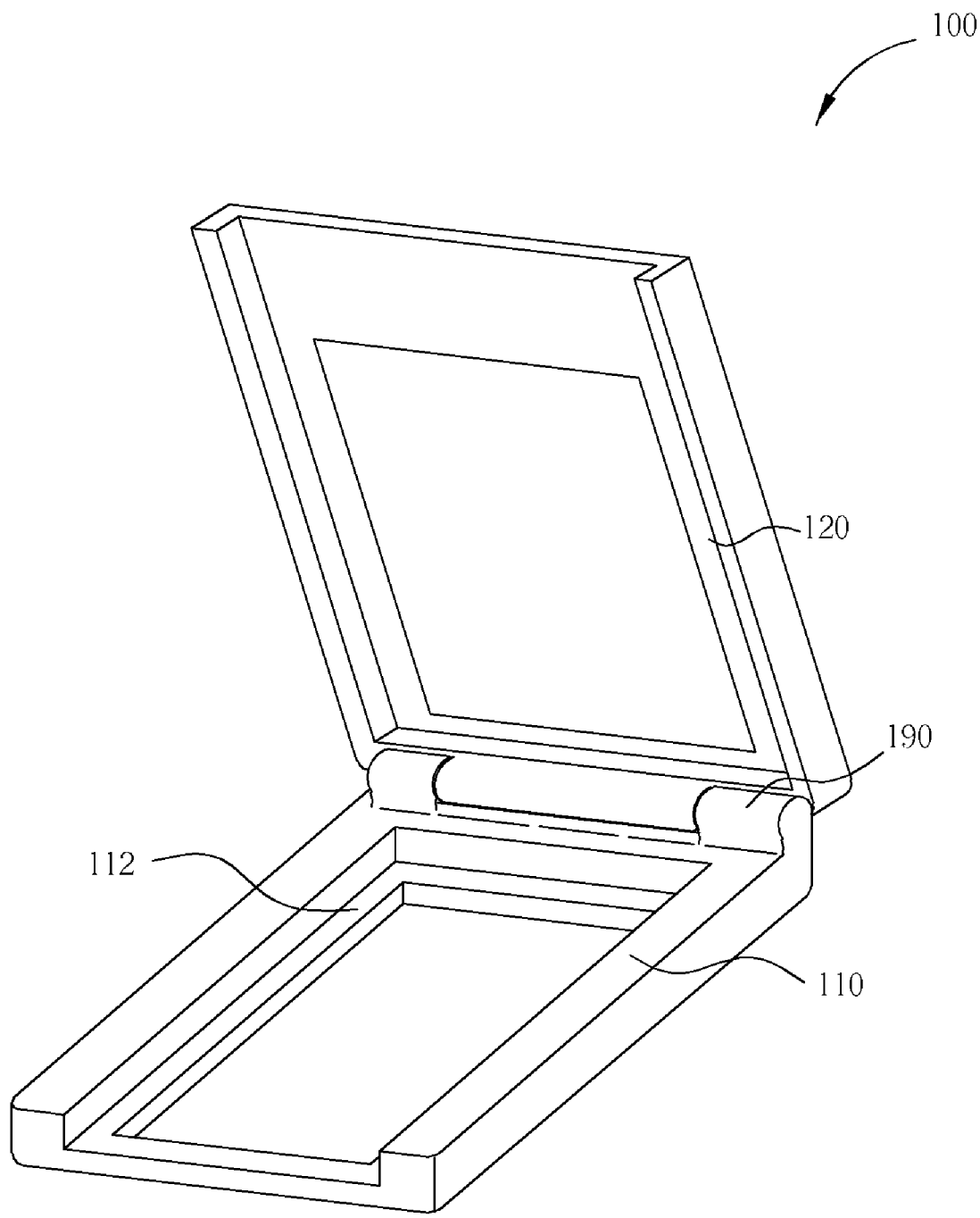
FIG. 1 is a schematic diagram of a prior art film fixture when the cover is open.
Figure 2:
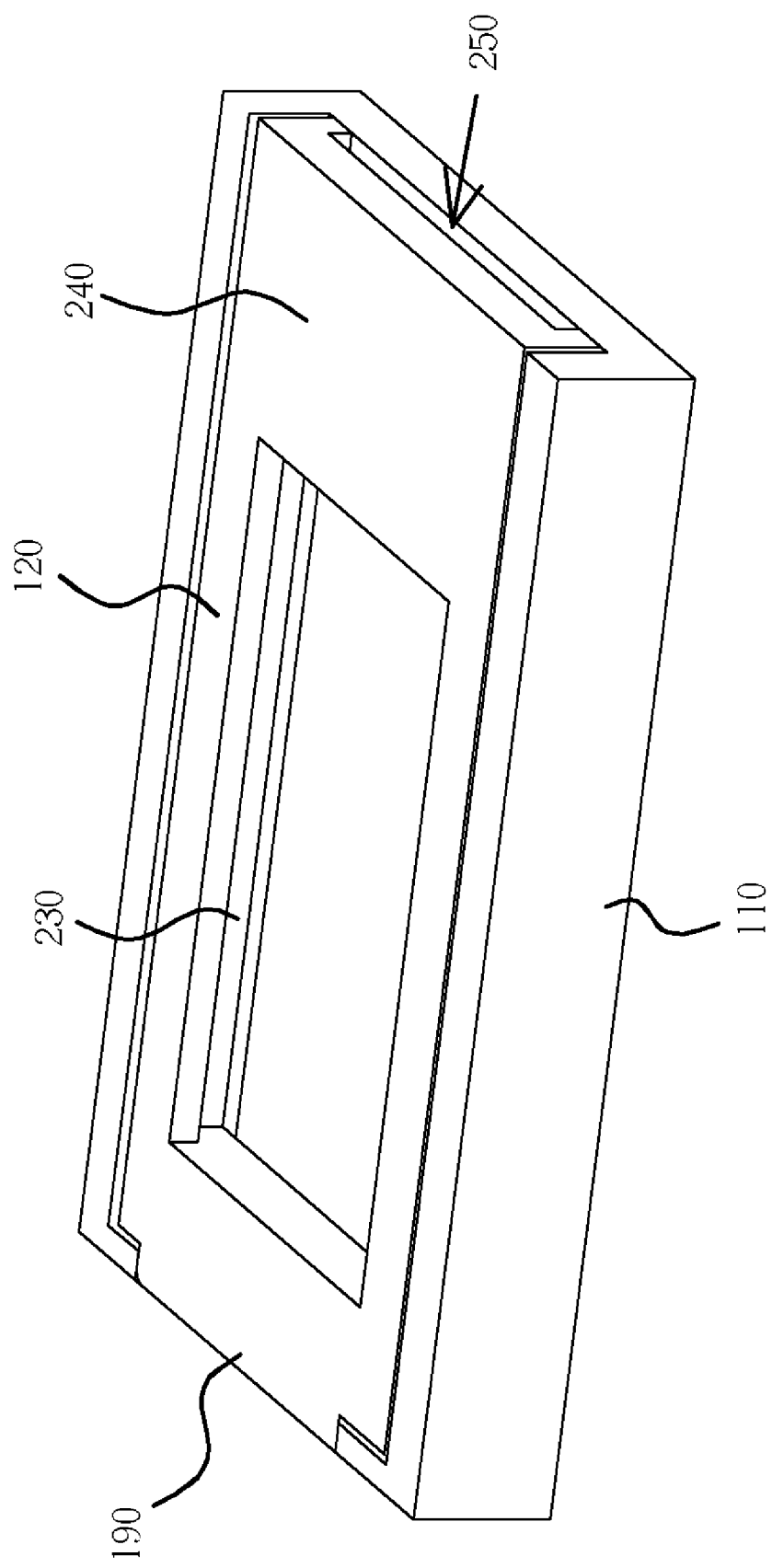
FIG. 2 is a schematic diagram of the film fixture in FIG. 1 when the cover is closed.

Compared to the prior art, the present invention can take the prior art method to fix the film after the cover and the carrier are open (FIG. 1) or have the film inserted into the clamping apparatus from the second film door after the cover is rotated relative to the carrier until it lies on the carrier as in the prior art (FIG. 2). Furthermore, another film insertion path can also be set up to have the film inserted from the first film door. The present invention allows users to choose the way of film insertion according to their personal preferences. The present invention also improves the clamping apparatus by changing the film insertion way from the occlusive bottom to the upper opening, so that the film is prevented from being scratched. The cover of the present invention can be produced from one molding, so the producing process is simpler, and the cost is reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A clamping apparatus for fixing a film comprising:
   a carrier comprising a slot;
   a cover positioned in the slot; and
   a cannelure formed between the cover and the carrier and having a cannelure opening connected to a first film door wherein for guiding the film inserted from the first film door to a predetermined position,
   wherein the cover comprises
   an upper ramp positioned on one side of the cannelure opening for guiding the film from the first film door to the cannelure opening, wherein a first edge of the upper ramp is near the cannelure opening, and a second edge of the upper ramp is away from the cannelure opening and inclines toward the first edge of the upper ramp.

2. The clamping apparatus of claim 1, wherein the cover further comprises a lower ramp positioned on the other side of the cannelure opening, and a second film door formed between the lower ramp and the carrier and connected to the cannelure opening, wherein the lower ramp is used to guide the film from the second film door to the cannelure opening, wherein the lower ramp has a first side near the cannelure opening and a second side away from the cannelure opening and inclining toward the first side.

3. The clamping apparatus of claim 1, wherein the cover further comprises: a first clamping rod and a second clamping rod, wherein the first and the second clamping rods form the cannelure with the carrier, and the area between the first and the second clamping rods defines a first light-pervious area.

4. The clamping apparatus of claim 3, wherein the slot comprises a second light-pervious area corresponding to the first light pervious area.

5. The clamping apparatus of claim 4, wherein the film is slide film.

6. The clamping apparatus of claim 1, further comprising: a pivot element coupled to the carrier and the cover, wherein the cover lies on the slot of the carrier through the pivot element and capable of rotating relatively to the carrier.

7. An image processing apparatus having a clamping apparatus for fixing a film comprising:
   the clamping apparatus; and
   an image processing module, for performing a predetermined image process on the object, wherein the clamping apparatus comprising:
   a carrier comprising a slot;
   a cover positioned in the slot; and a cannelure formed between the cover and the carrier and having a cannelure opening connected to a first film door, wherein the cannelure is used for guiding the film inserted from the first film door to a predetermined position, the cover comprising:
> an upper ramp, positioned on one side of the cannelure opening, for guiding the film from the first film door to the cannelure opening, wherein a first edge of the upper ramp is near the cannelure opening, and a second edge of the upper ramp is away from the cannelure opening and inclines to the first edge of the upper ramp.

8. The image processing apparatus of claim 7, further comprising a housing, wherein the housing has an opening, the image processing module is positioned inside the housing, and the clamping apparatus is removably installed in the image processing apparatus through the opening.

9. The image processing apparatus of claim 7, wherein the image processing module is a scanning module or a photocopy module.

10. The image processing apparatus of claim 7, wherein the image processing apparatus is a scanner, a photocopier, or a multifunction printer.

11. The image processing apparatus of claim 7, wherein the cover further comprises a lower ramp positioned on the other side of the cannelure opening and a second film door formed between the lower ramp and the carrier and connected to the cannelure opening, wherein the lower ramp is used to guide the film from the second film door to the cannelure opening, wherein the lower ramp has a first side near the cannelure opening and a second side away from the cannelure opening and inclining toward the first side.

12. The image processing apparatus of claim 7, wherein the cover further comprises: a first clamping rod and a second clamping rod, wherein the first and the second clamping rods form the cannelure with the carrier, and the area between the first and the second clamping rods defines a first light-pervious area.

13. The image processing apparatus of claim 12, wherein the slot comprises a second light-pervious area corresponding to the first light-pervious area.

14. The image processing apparatus of claim 13, wherein the film is slide film.

15. The image processing apparatus of claim 7, wherein the clamping apparatus further comprises a pivot element coupled to the carrier and the cover, wherein the cover lies on the slot of the carrier through the pivot element and capable of rotating relative to the carrier.

* * * * *